*US009769902B1*

United States Patent
Cain et al.

(10) Patent No.: US 9,769,902 B1
(45) Date of Patent: Sep. 19, 2017

(54) LASER SENSOR STIMULATOR

(75) Inventors: Anthony M. Cain, Beavercreek, OH (US); Danny J. Hugh, Fairborn, OH (US); Donald R. Thomas, Beavercreek, OH (US); Shawn R. Davidson, Xenia, OH (US)

(73) Assignee: The United States of America as represented by Secretary of the Air Force, Washington, DC (US)

( * ) Notice: Subject to any disclaimer, the term of this patent is extended or adjusted under 35 U.S.C. 154(b) by 1659 days.

(21) Appl. No.: 13/103,440

(22) Filed: May 9, 2011

(51) Int. Cl.
| | |
|---|---|
| *G01C 3/08* | (2006.01) |
| *H05B 37/00* | (2006.01) |
| *F41G 1/00* | (2006.01) |
| *F21V 21/00* | (2006.01) |
| *F21V 33/00* | (2006.01) |
| *G01B 21/00* | (2006.01) |
| *F41G 1/32* | (2006.01) |

(52) U.S. Cl.
CPC ............ *H05B 37/00* (2013.01); *F21V 21/00* (2013.01); *F21V 33/00* (2013.01); *F41G 1/00* (2013.01); *F41G 1/32* (2013.01); *G01B 21/00* (2013.01); *G01C 3/08* (2013.01)

(58) Field of Classification Search
CPC ... F41G 1/00; F41G 1/32; F21V 21/00; F21V 33/00; H05B 37/00; G08B 21/00; G01C 3/08
USPC ............ 356/3.01–3.16, 4.01–4.1, 5.01–5.15; 372/29.011, 29.12, 34
See application file for complete search history.

(56) References Cited

U.S. PATENT DOCUMENTS

| | | | | |
|---|---|---|---|---|
| 3,392,260 | A | * | 7/1968 | Dernbach ............... 219/121.11 |
| 3,627,429 | A | * | 12/1971 | Jaenicke et al. .............. 356/153 |
| 4,050,068 | A | | 9/1977 | Berg et al. |
| 4,146,780 | A | | 3/1979 | Sprey |
| 4,205,902 | A | | 6/1980 | Shafer |
| 4,273,536 | A | | 6/1981 | Wick |
| 4,276,520 | A | * | 6/1981 | Rosenberg ..................... 372/34 |
| 4,647,759 | A | | 3/1987 | Worsham et al. |
| 5,036,517 | A | * | 7/1991 | Meyers ...................... 372/38.04 |
| 5,072,342 | A | * | 12/1991 | Minovitch .................... 362/111 |
| 5,198,607 | A | | 3/1993 | Livingston et al. |
| 5,216,236 | A | | 6/1993 | Blais |
| 5,532,880 | A | | 7/1996 | Robb |
| 5,612,503 | A | | 3/1997 | Sepp |
| 5,676,450 | A | * | 10/1997 | Sink et al. .................... 362/112 |
| 5,685,636 | A | * | 11/1997 | German ........................ 362/259 |
| 5,711,102 | A | * | 1/1998 | Plaster et al. ................ 42/71.01 |
| 5,739,787 | A | | 4/1998 | Burke et al. |
| 5,747,720 | A | | 5/1998 | Schnurr et al. |
| 5,864,481 | A | | 1/1999 | Gross et al. |

(Continued)

OTHER PUBLICATIONS

Brock N. Meeks, Air Force develops "dazzling" laser weapon, www.msnbc.com, Nov. 30, 2005.

(Continued)

*Primary Examiner* — Assres H Woldemaryam
(74) *Attorney, Agent, or Firm* — AFMCLO/JAZ; Charles Figer, Jr.

(57) ABSTRACT

A laser sensor stimulator integrates laser units, an inertial measurement unit, a control unit, and ergonomic, modular design with GPS data feeds into a portable system that can be used to test energy sensors and warning devices and includes a user interface facilitates tracking and acquisition of items of interest by the laser sensor stimulator.

8 Claims, 4 Drawing Sheets

(56) References Cited

U.S. PATENT DOCUMENTS

| | | |
|---|---|---|
| 5,955,724 A | 9/1999 | Livingston |
| 5,968,383 A | 10/1999 | Yamazaki et al. |
| 5,973,309 A | 10/1999 | Livingston |
| 6,449,892 B1 | 9/2002 | Jenkins |
| 6,517,133 B2* | 2/2003 | Seegmiller et al. .......... 294/139 |
| 6,582,299 B1* | 6/2003 | Matsuyama et al. ............. 463/2 |
| 6,616,301 B2 | 9/2003 | Brown et al. |
| 6,910,660 B2 | 6/2005 | LeCroy, Jr. |
| 6,962,532 B2 | 11/2005 | Hasebe et al. |
| 7,040,780 B2 | 5/2006 | Diehl |
| 7,171,776 B2 | 2/2007 | Staley, III |
| 7,231,862 B1* | 6/2007 | Quinn .......................... 89/41.05 |
| 7,623,059 B2 | 11/2009 | Klein |
| 7,640,106 B1 | 12/2009 | Stokar et al. |
| 7,773,202 B2 | 8/2010 | Crawford et al. |
| 7,779,572 B2* | 8/2010 | Potterfield et al. ................ 42/94 |
| 7,845,817 B1* | 12/2010 | Miller .......................... 362/110 |
| 7,863,551 B2 | 1/2011 | Bang et al. |
| 7,866,082 B2* | 1/2011 | Eisenberg et al. .............. 42/131 |
| 7,920,608 B2* | 4/2011 | Marsland et al. ....... 372/29.011 |
| 7,954,272 B2* | 6/2011 | Potterfield et al. ................ 42/94 |
| 8,113,689 B2* | 2/2012 | Mayo et al. .................. 362/253 |
| 8,151,507 B2 | 4/2012 | Johnson ............................ 42/94 |
| 8,189,630 B2* | 5/2012 | Marsland et al. ....... 372/29.011 |
| 8,294,073 B1* | 10/2012 | Vance et al. .............. 250/203.1 |
| 2003/0180692 A1 | 9/2003 | Skala et al. |
| 2003/0206285 A1 | 11/2003 | Lau |
| 2005/0057745 A1* | 3/2005 | Bontje ..................... 356/139.03 |
| 2005/0185403 A1* | 8/2005 | Diehl ............................ 362/259 |
| 2005/0243224 A1* | 11/2005 | Choi et al. ...................... 349/11 |
| 2006/0256559 A1 | 11/2006 | Bitar |
| 2008/0304524 A1* | 12/2008 | Marsland et al. ....... 372/29.011 |
| 2009/0056153 A1* | 3/2009 | Tippett et al. .................. 33/228 |
| 2009/0111454 A1* | 4/2009 | Jancic et al. .................. 455/420 |
| 2009/0198401 A1 | 8/2009 | Ledet et al. |
| 2009/0218884 A1* | 9/2009 | Soar ............................... 307/11 |
| 2009/0219961 A1* | 9/2009 | Meyers et al. ............. 372/29.01 |
| 2009/0254278 A1 | 10/2009 | Wang |
| 2009/0260511 A1 | 10/2009 | Melnychuk et al. |
| 2010/0007580 A1* | 1/2010 | Scales ............................... 345/8 |
| 2010/0192447 A1* | 8/2010 | Cabahug et al. ................. 42/84 |
| 2010/0275454 A1* | 11/2010 | Tippett et al. .................. 33/228 |
| 2011/0021293 A1* | 1/2011 | York et al. ..................... 473/407 |
| 2011/0231035 A1* | 9/2011 | Houde-Walter et al. ......... 701/2 |

OTHER PUBLICATIONS

Michael Hafften and Robert Stratton, High-Energy Laser Weapon Integration with Ground Vehicles, Paper presented at the RTO AVT Symposium, Jun. 7-9, 2004.

* cited by examiner

LASER SENSOR STIMULATOR

RIGHTS OF THE GOVERNMENT

The invention described herein may be manufactured and used by or for the Government of the United States for all governmental purposes without the payment of any royalty.

BACKGROUND

Several classes of laser detection, characterization, and warning receivers have been developed for employment on civilian and military aircraft. Traditionally, these sensors undergo extensive laboratory and ground characterization and test, but very little validation and direct-illumination during actual flight. Existing means of in-flight characterization generally rely upon non-purpose-built, expensive, and cumbersome aircraft trackers with custom integrated and calibrated laser sources and telescopes—all requiring extensive teams of specialized engineers and technicians to employ. These national-level test assets are in great demand and are rarely accessible to support small-scale and quick-reaction airborne laser sensor stimulation for development and test. Moreover, their cost limits their use for small-scale development and test activities.

SUMMARY OF INVENTION

The disclosed laser sensor stimulator provides a low-cost, agile means to support the development, testing, and periodic validation of ground and airborne laser sensors. It also can be used in environments where it may be advantageous to stimulate airborne laser sensors during flight operations. The laser sensor stimulator can illuminate sensors with multiple co-aligned lasers in a field environment through its ability to track aircraft and receive tracking data pertaining to aircraft and items of interest to be tracked (e.g. from a flight test range). The laser sensor stimulator monitors the direction (azimuth and elevation) in which laser energy is propagated with respect to a fixed frame of reference. The laser sensor stimulator also provides the exact spatial location of an operator. The laser sensor stimulator tracks all three components (aircraft position, laser sensor stimulator pointing direction, and laser sensor stimulator position) in real-time and provides this information to an operator in real-time via a novel user interface. For the system to be operated safely for operators, aircrews, and other personnel, certain system characteristics such as laser power levels must meet local and federal safety regulations. The laser sensor stimulator includes features that mitigate these risks such as safety lockouts based on laser safety parameters, laser keys, protective equipment, and software monitoring in addition to procedural safety measures such as training. The laser sensor stimulator records operational data concerning its activities and activities of aircraft and other items of interest it tracks and synchronizes this data to a common time code so the effectiveness of laser sensors, laser warning devices, and other devices that are stimulated by the laser sensor stimulator can be assessed.

A laser sensor stimulator comprises: a housing; at least one laser unit removably attached to the housing; an inertial measurement unit attached to the housing; at least one switch for activating the at least one laser unit; and a control unit, wherein the control unit is connected to the at least one laser unit, the inertial measurement unit, and the at least one switch to control operation of the laser sensor stimulator.

A method of stimulating a laser sensor or laser warning device comprises: receiving range data corresponding to items of interest to be tracked and acquired by at least one laser unit; processing the range data to create a user interface that displays the items of interest to enable an operator to identify and engage the items of interest; activating the at least one laser unit to emit laser energy; and displaying the results of the lasing activity on the user interface.

A user interface for a laser sensor stimulator comprising: a scope view that displays the azimuth orientation of the laser sensor stimulator; a perspective view that displays the elevation and field of view of the laser sensor stimulator; and a data display that displays information pertaining to items of interest to be tracked, user defined points, status of the at least one laser unit on the laser sensor stimulator.

DETAILED DESCRIPTION

Figure 1:
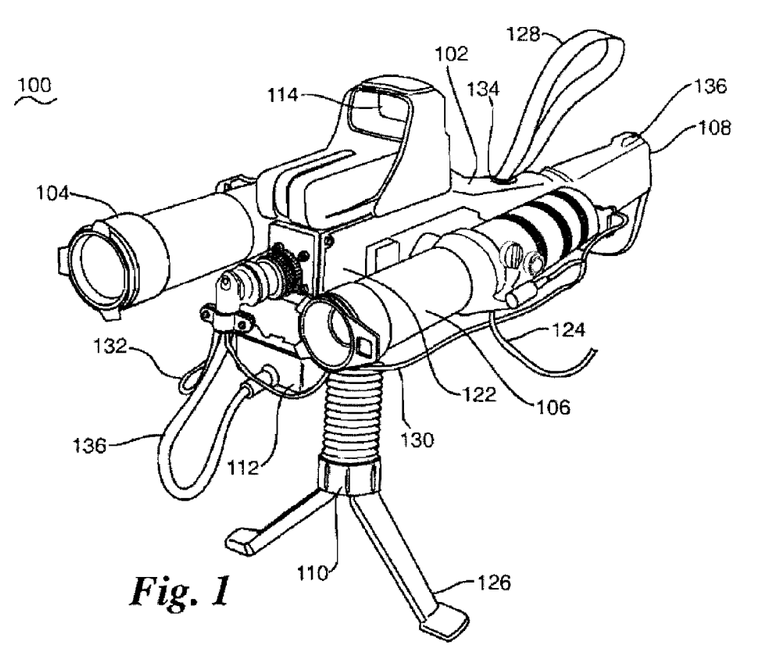
FIG. 1 is a front perspective view of a laser sensor stimulator.
Figure 2:
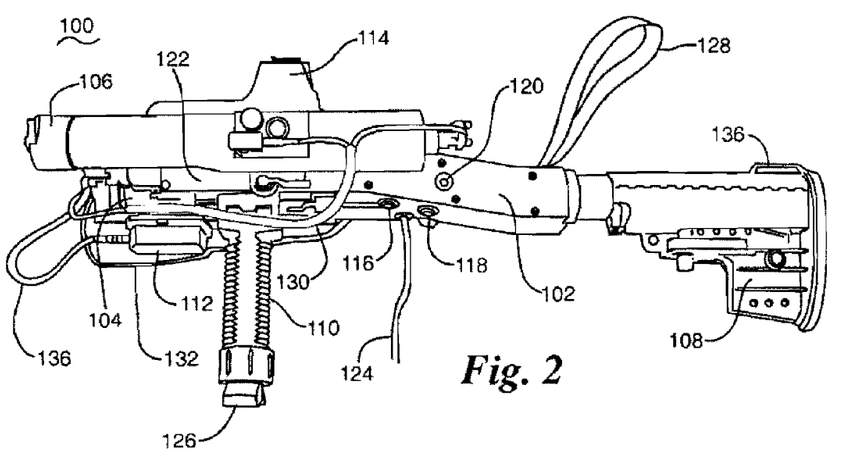
FIG. 2 is side view of the laser sensor stimulator of FIG. 1.

As disclosed herein, a laser sensor stimulator 100 includes a housing 102, laser units 104, 106, a rifle stock 108, a tactical foregrip 110, an inertial measurement unit 112, a sight 114, laser switches 116, 118, auxiliary switches 120, and a control unit 122. An umbilical cable 124 connects the laser sensor stimulator 100 to a laser sensor stimulator system described below. The housing 102 is a generally longitudinal shell that provides a platform for mounting the other components of the stimulator 100. The laser units 104, 106 are attached to the housing 102 with one laser unit 104, 106 positioned on each side of the housing 102 with the longitudinal axis of each laser unit 104, 106 aligned with the longitudinal axis of the housing 102. The laser units 104, 106 are connected to the housing 102 via quick-release mounts (not shown) to permit rapid assembly and disassembly of the stimulator 100 and easy exchange of different laser units. The laser units 104, 106 may be any portable laser or emitter. The use of two laser units 104, 106 permits operators to increase the total amount of energy emitted by stimulator 100 or to emit energy in different spectra simultaneously to test multiple sensors. Additional laser units may be attached to the housing 102 to provide additional sources and intensities of energy, different frequencies, and the like. The housing 102 can include additional attachment areas for additional laser units. The sight 114 is mounted along the top of the housing 102 so an operator can sight the laser sensor stimulator 100 prior to powering the laser units 104, 106 and during operation. The sight 114 can be a holographic site with night vision capability that dims the holographic image during night operations so the sight 114 is compatible with night vision goggles. At least two of the laser units 104, 106 and the sight 114 are adjustable along vertical and horizontal axes to enable accurate bore sighting of the stimulator 100. For example, if one of the laser units 104 is mounted in a fixed manner to the housing 102, an operator can bore sight that laser unit 104 and then adjust the settings of other laser unit 106 and the sight 114 to match the fixed laser unit 104. The sight 114 and the other laser unit 106 are adjustable in horizontal and vertical axes. The inertial measurement unit 112 is attached to the housing 102 and provides real-time absolute information concerning the orientation of the stimulator 100 in terms of the azimuth and elevation in which the stimulator 100 and hence the laser units 104, 106 are directed.

The rifle stock 108 can be collapsible to permit adjustment for different operators and uses. The tactical foregrip 110 provides a hand grip for an operator and also expands into a bipod 126 to support the stimulator 100 on the ground or other surface, if desired. A sling 128 can be attached to the stimulator 100 for carrying the stimulator 100 or supporting it during operation. The sling 128 can be attached to a clip 134 on the housing 102, or it can be attached between the housing clip 134 and a clip 136 on the rifle stock 108. The rifle stock 108, the foregrip 110, and the sling 128 are ergonomic features that facilitate operation of the stimulator 100 from different positions such as, for example, aiming the stimulator 100 from a shoulder-held position via the sight 114, aiming the stimulator 100 in a shoot-from-the-hip configuration, or aiming the stimulator 100 from a prone position while supporting it on the bipod 126. These ergonomic features and lightweight construction of the stimulator 100 enable an operator to use the stimulator 100 for extended periods of time. The compact, modular design of the stimulator 100 also enables rapid assembly and disassembly of the stimulator 100 for storing and shipping.

Figure 3:
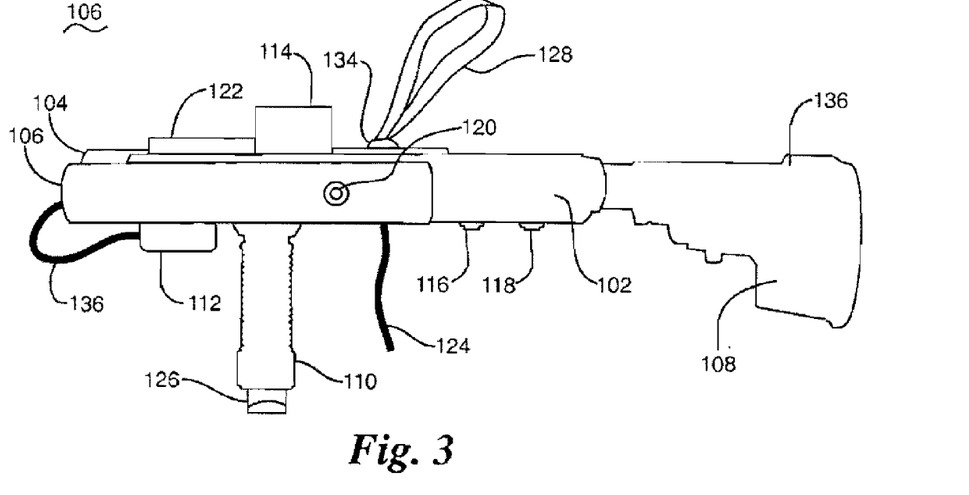
FIG. 3 is a diagram of a laser sensor stimulator.

The control unit 122 comprises a circuit board and associated electronics that are positioned inside the housing 102. The control unit 122 includes interfaces and command and control electronics, as describe in more detail below. The control unit 122 is connected to the inertial measurement unit 112 by a cable 136 and to each laser 104, 106 by cables 130, 132, to control and receive data from these components. The laser switches 116, 118 are used to activate each respective laser unit 104, 106. The laser switches 116, 118 may be buttons that an operator presses to activate a laser unit 104, 106, or another type of actuator such as a single pole, double throw switch. The laser switches 116, 118 are connected to the control unit 122, which provides a safety lockout that prevents operation of the laser units 104, 106 when the laser switches 116, 118 are pressed in certain circumstances. The laser switches 116, 118 are positioned along a bottom, rear portion of the housing 102 to be easily-accessible to an operator. The auxiliary switches 120, which are positioned on either side of the housing 102, can be programmed to provide a variety of functions including, for example, a calibration function that calibrate the inertial measurement unit 112 before the stimulator 100 is operated. The umbilical cable 124 provides power for the laser units 104, 106 and the control unit 122, and provides a data link between the stimulator 100 and a computing unit 210 that is described below.

Depending on operational requirements, the stimulator 100 can include different combinations of the rifle stock 108, the tactical grips 110, the bipod 126, and/or the sling 128, and different configurations of these components may be used. Each component is detachably mounted to the housing 102. The modular design of the stimulator 100 facilitates rapid repair and replacement of these and the other components. The ruggedized construction makes the stimulator 100 resistant to extreme elements such as wind, rain, sand, dirt, dust, heat, and cold, and extreme environments. The ergonomic features and other components of the stimulator 100 are integrated into an intuitive design that operators can rapidly familiarize themselves with and operate effectively in a wide variety of environments.

Figure 4:
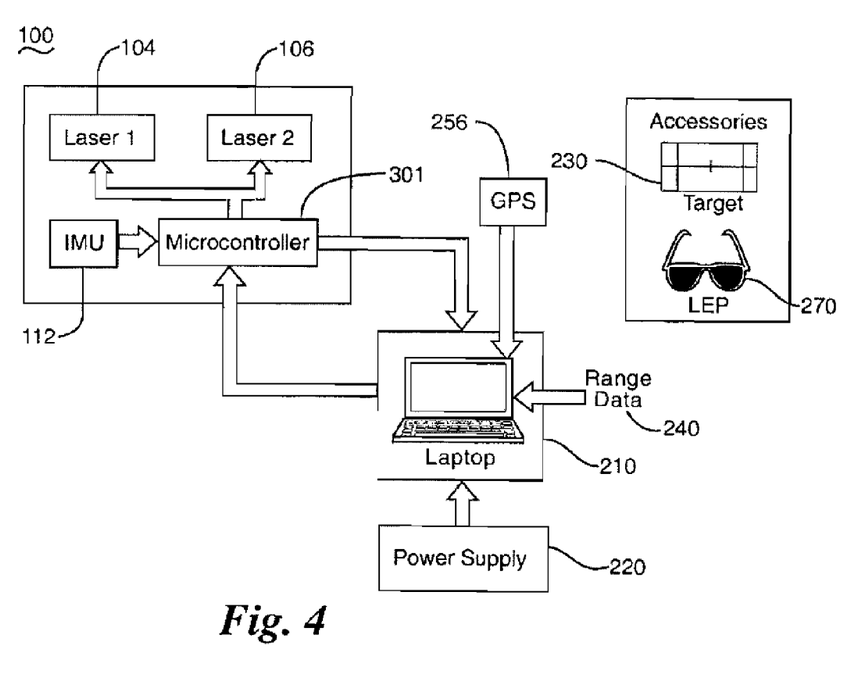
FIG. 4 is a diagram of a laser sensor stimulator system.

The laser sensor stimulator 100 can be connected to a computing device 210 that receives range data 240 from an external feed and GPS data 256. The computing device 210 runs custom software that processes the range data 240 and displays a user interface to provide an operator with situational awareness of the surrounding environment, airspace and the status of the stimulator 100. The computing device 210 is connected to the stimulator 100 via the umbilical cord 124 and to an external power supply 220 such as a portable battery pack, a DC power supply, a vehicle power port, or an AC power supply. The power supply 220 includes a converter that steps down DC voltage and current for the computing device 210, or an AC/DC converter, depending on the power source. The computing device 210 may be practically any computer, computer system, or programmable device, such as for example a laptop computer, multi-user or single-user computers, desktop computers, portable computers and devices, handheld devices, network devices, mobile phones, and the like. In this example, the computing device 210 comprises a portable laptop computer. The range data 240 comprises data streams of aircraft positions with GPS coordinates and other identifiers. The computing device 210 receives and processes the range data 240 and displays a user interface that enables operators to identify, track, and acquire aircraft and other items of interest with the laser sensor stimulator 100. A target 230 can be used to calibrate the stimulator 100 prior to use. The target 230 is positioned in the vicinity of the stimulator 100 and GPS coordinates of the target 230 are obtained and entered into the computing device 210. Then, the stimulator 100 is sighted on the target 230 and the calibration auxiliary switch 120 is pressed. When this occurs, the inertial measurement unit 112 is calibrated based on the location of the target 230 and the stimulator 100 is ready for use. This procedure provides a simple, reliable means for an operator to prepare a stimulator 100 for use. Operators also wear laser eye protection (LEP) 270 for safety.

Figure 5:
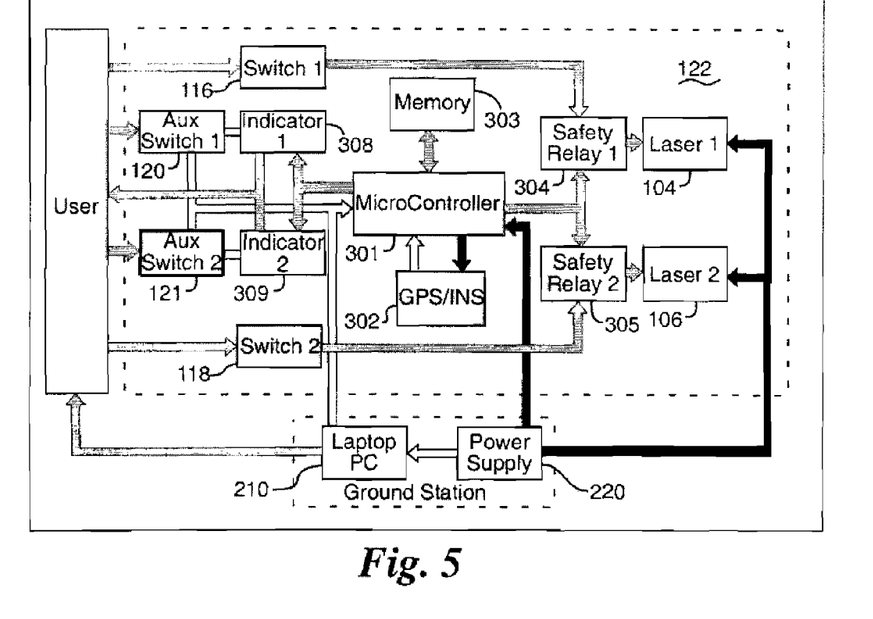
FIG. 5 is a diagram of a control unit of a laser sensor stimulator.

The control unit 122 includes a microcontroller 301, a Global Positioning System/Inertial Navigation System (GPS/INS) 302, memory 303, safety relays 304, 305, laser switches 116, 118, and auxiliary switches 120, 121 with indicators 308, 309. The microcontroller 301 comprises one or more processors (e.g. microprocessors, central processing units, arithmetic logic units, graphical processing units). The microcontroller 301 is coupled to the memory 303, which may comprise random access memory (RAM) devices of the main storage of control unit 122, as well as any supplemental levels of memory, such as for example, cache memories, non-volatile or backup memories (e.g. programmable or flash memories), read-only memories, and the like. In this example, the memory 303 includes flash memory. The microcontroller 301 is connected to, and communicates with, the computing unit 210 via the umbilical cable 124 or a wireless interface, if desired. The laser switches 116, 118 are used by an operator to actuate the laser units 104, 106. The safety relays 304, 305 are connected in circuit with the laser switches 116, 118, and the laser units 104, 106 and are controlled by the microcontroller 301 to provide a safety lockout for the laser units 104, 106. The microcontroller 301 can actuate the safety relays 304, 305 to open the circuit to one or both laser units 104, 106 and prevent either laser unit 104, 106 from operating when the respective laser switch 116, 118 is pressed. Each auxiliary switch 120, 121 has an indicator 308, 309 such as an LED light, that provides a visual indication when the auxiliary switch 120, 121 is actuated. The auxiliary switches 120, 121 can be programmed to provide different functions including initial calibration and target cycling. For example, if the second auxiliary switch 121 is programmed to provide target cycling, the field of view of the stimulator 100 cycles from one target to another each time the second auxiliary switch 121 is pressed to help an operator sequentially track and acquire items of interest with the stimulator 100. The lasers maintain their original safety keys, arming switches, and notification LEDs. The microcontroller 301 receives inputs from the safety keys and arming switches of the laser units 104, 106 and can lockout the laser switches 116, 118 with the safety relays 304, 305 to prevent the laser units 104, 106 from lasing unless the keys are in place and the arming switch is in the "On" position. If any of these conditions is not met, the microcontroller 301 activates the safety relay 304, 305 to open the circuit to the particular laser unit 104, 106 and prevent the laser unit 104, 106 from operating. Azimuth and elevation data is provided by the inertial measurement unit 112 to the GPS/INS 302 so the precise orientation of the stimulator 100 (and laser units 104, 106) is known. This data is fed to the computing device 210 through the microcontroller 301 and umbilical cord 124, which also provides power to the control unit 122.

Figure 6:
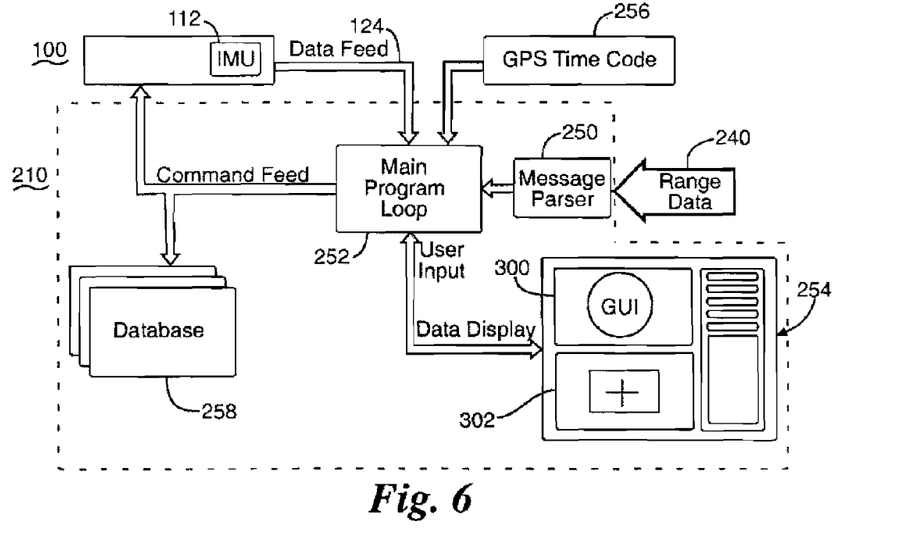
FIG. 6 is a block diagram of a computing device for the laser sensor stimulator.
Figure 7:
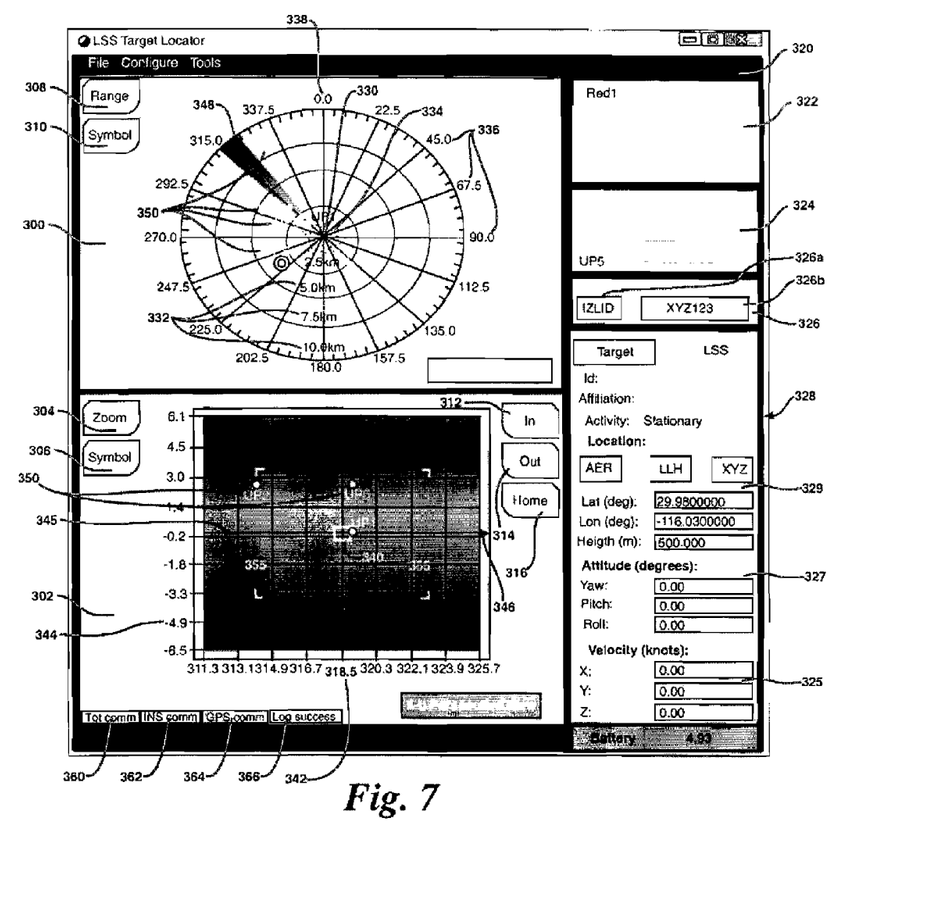
FIG. 7 is a user interface for a laser sensor stimulator.

The computing device 210 operates under control of an operating system and executes or otherwise relies on various computer software applications, components, programs, objects, modules, data structures, databases, and the like. The computing device 210 operates a main program 252 that processes data from the stimulator 100, range data 240, and GPS data 256, controls the stimulator 100, and provides a user interface 254. The main program 252 also maintains and accesses databases 258 of operational data for the stimulator 100 and the range data 240 and GPS data 256. The range data 240 is processed by a message parser 250, which strips out pertinent data for the main program 252 to process. The parser 250 utilizes a plug-in architecture so different versions can be used for different data feeds. The main program 252 processes the parsed range data 240 and creates a list of aircraft, aircraft, vehicle, and other items of interest that the stimulator 100 can track and acquire. It displays icons and other information via a user interface 254 on the computing device 210. The program 252 continually monitors inputs and operational information from the laser sensor stimulator 100 including actuations of the switches 116, 118, 120, 121 and information from the inertial measurement unit 112. It also controls the lasers 104, 106 and updates the user interface 254 in real-time. The GPS position of the operator is provided by an on-board GPS antenna (not shown) within the computing device 210. The GPS antenna may be a separate device or it may be positioned on the stimulator 100. The GPS antenna receives GPS time codes 265 and uses those to determine its position. The main program 252 combines GPS time codes 256 with parsed range data 240 and stimulator 100 information to record all events and uses of the stimulator 100 in time sequence and store the data in a database 258 for recall and processing. This processing provides a complete time-stamped log of all operations of the stimulator 100 in a particular environment and event. The user interface 254 provides a graphical depiction of the local airspace and environment with accompanying visual and audio status information for the laser sensor stimulator 100 and items of interest. The primary displays of the graphical user interface 254 include an overhead or scope view 300 and a perspective view 302. The operator and stimulator 100 are positioned at the center 330 of the scope view and the azimuth of orientation of the stimulator 100 is shown as a field of view 348. The perspective view 302 depicts an artificial horizon and the stimulator 100 appears as in icon 340 at the center. The perspective view 302 displays the elevation of the stimulator 100 with respect to the horizon. The displays 300, 302 are updated in real-time as an operator uses the laser sensor stimulator 100 to track and acquire items of interest.

The scope view 300 and perspective view 302 include a number of features that facilitate tracking and acquisition of items of interest. In the perspective view 302, these include the zoom feature 304, which enables an operator or user at the computing device 210 to zoom in on a particular item. The zoom feature 304 helps an operator locate and acquire items in the field of view. When zoom 304 is selected, the perspective view 302 displays In 312, Out 314, and Home 316 buttons. The In 312, Out 314, and Home 316 buttons are used to zoom in, zoom out, or return to a default Home setting that provides a preset field of view. The symbol feature 306 enables an operator or user to remove or add symbols to the perspective view 302. These symbols include the horizontal or x-axis 342, which shows the orientation or azimuth in which the stimulator 100 is pointing. The values of the horizontal axis 342 correspond to directional azimuths 336 displayed in the scope view 300 and the field of view 348 of the stimulator 100, which is oriented at 318.5 degrees in this example. The vertical or y-axis 344 of the perspective view 302 displays the degrees of elevation of the stimulator 100 relative to the horizon 345. An arrow 346 indicates the direction the stimulator 100 must move to acquire a particular item of interest that is being tracked. If items of interest are programmed into the computing device 210 and selected for tracking, the arrow feature 346 can be used with a cycling function to help an operator quickly identify, track, and acquire different items of interest. The perspective view 302 also includes Tgt comm 360, INS comm 362, GPS comm. 364, and Log success 366 indicators. Tgt Comm 360 indicates whether range date 240 is being received by the system. INS comm. 362 indicates whether the inertial measurement unit 112 is operating and providing data to the system. GPS comm 364 indicates whether GPS signals are being received by the system. Log success 366 indicates whether the system is logging data about the operation of the stimulator 100.

The scope view 300 provides a 360 degree or bird's eye view of the orientation of the stimulator 100. The center 330 of the scope view 300 represents the location of the operator and the stimulator 100 based on GPS coordinates of the computing device 210. From the center 330, each concentric ring displays the range 332, which is shown in 2.5 km increments in FIG. 7. The range feature 308 changes the ranges 332 shown in the scope view 300. In FIG. 7, the range 332 is set at 10 km in 2.5 km increments and the scope view 300 displays items of interest in that range. When the range feature 308 is selected, preset ranges appear and an operator can select ranges of 1 km, 10 km, 30 km, or 50 km, with corresponding increments such as 0.25 km for a 1 km range or 7.5 km for a 30 km range. This feature helps operators track and acquire items of interest in particular ranges. The scope view 300 also displays a safety zone 334 around the center 330. The safety zone 334 designates an area in which the laser units 104, 106 cannot be activated. If the stimulator 100 is aimed at items of interest in the safety zone 334, the main program 252 locks out the laser triggers 116, 118, via the safety relays 304, 305 to prevent the laser units 104, 106 from lasing. An audible sound can be played to alert an operator that the stimulator 100 attempted to engage an item within the safety zone and is locked out. Depending on the strength of the laser units 104, 106, the operational environment, items of interest, and other factors, the safety zone 334 may be adjusted to provide the necessary degree of operational safety for use of the stimulator 100. The field of view of the stimulator 100 appears as a highlighted portion 348 that expands as range increases. When the laser units 104, 106 are operated, the field of view 348 is illuminated. As shown in FIG. 7, the stimulator 100 is oriented at about 318 degrees. A safety zone of permissible azimuths may be defined and the main program 252 will lockout the laser triggers 116, 118 if an operator attempts to engage items outside the permissible azimuths. An audible sound can be played to alert an operator that the stimulator 100 is aimed outside of permissible azimuths and is locked out. The field of view 348 may be highlighted in a particular color when the stimulator 100 is pointed at an unauthorized azimuth or locked out and when the stimulator is operated. The symbol feature 310 serves the same purpose as on the perspective view 302 to add or remove features from the scope view 300 such as the azimuths, 336 and the range 332. True north is at 0.0 degrees 338.

These features of the scope view 300 and perspective view 302 enable operators to rapidly identify and track items of interest. The directional azimuths 336 show the position of items of interest in relation to the field of view 348 of the stimulator 100 and provide an azimuth to acquire a particular item of interest. Once the stimulator 100 is aligned along the azimuth for an item of interest, the perspective view 302 can be used to acquire the item for lasing. To promote rapid identification, items of interest can be color-coded according to their status, such as for example, red for opposition, blue for friendly, green for unidentified, and orange for user points. Items of interest can be highlighted in the scope and perspective views 300, 302 for more rapid identification and tracking. The field of view 348 of the stimulator 100 is based on outputs of the inertial measurement unit 112 and displayed as a slice 348 emanating from the operator's position 330 at the center of the scope view 300. The field of view 348 is displayed in the perspective view 302 by four field of view indicators 355 that bracket the stimulator's field of view to indicate the approximate region that receives energy from the laser units 104, 106. An icon 340 at the center of the field of view indicators 355 represents the stimulator 100 and its point of focus. When the stimulator 100 acquires an item of interest, the item appears within the stimulator icon 340, the stimulator icon 340 is highlighted, and an audible sound is played.

The user interface 254 displays other operational information in a data box 320 extending along a right portion of the user interface 254. The data box 320 lists items of interest 322 within range of the stimulator 100. The in-range items are pulled from the range data 240 and indexed on unique identifiers reported by the range data 240. Custom handles can be applied to each item of interest for easier identification. For example, an assigned identifier of "XYZ12345ABC" can be given a custom call sign of "Red1". The individual identifiers can be displayed in different colors to indicate their status, as described above. The user points 324 displays user-defined points such as UP1, UP2, UP3, UP4, UP5, UP6 shown in FIG. 7. GPS coordinates are entered for each user point 350 and an operator can use them to aim, orient, or calibrate the stimulator 100. For example, GPS coordinates of a hill or tower can be entered into the main program 252 as user points that can be used to calibrate the stimulator 100 or provide features for rapid orientation of the stimulator 100 onto an item of interest in the vicinity of the user point. The laser status box 326 indicates which laser units are attached to the stimulator 100 and provides their current status. When a laser unit 104, 106 is activated, the associated laser indicator 326a, 326b is illuminated in the laser status box 326. The statistics box 328 displays data for a currently-selected item of interest and the laser sensor stimulator 100 (labeled "LSS"). The unique identifier of the item of interest, its affiliation as friend, foe, or unknown, and activity can be displayed with the location 329 in different coordinate systems. In FIG. 7, the geographic coordinates of latitude, longitude, and height are displayed. The target data 329 also can display coordinate locations in XYZ coordinates of an item or interest. The attitude 327 and velocity 325 of items of interest are displayed to aid in target acquisition and confirmation. In this case, the statistics box 328 displays attitude 327 and velocity 325 for UP5, which is stationary. The data box 320 also shows the battery voltage 323 of the system and provides an alert if the voltage nears or drops below required levels.

If one or both laser units 104, 106 is activated, the field of view 348 is highlighted in red or another color as are the field of view indicators 355 in the perspective view 302. An audible sound may be played to indicate activation of one or both laser units 104, 106. The laser status 326 displays each operational laser unit 326a, 326b in green. The selected target location, laser on/off state, and GPS time are all recorded to a database running in the background for later review to determine whether a particular item of interest was engaged by the stimulator 100.

The stimulator 100 and system can be employed in the following manner. An operator and spotter transport the stimulator 100 and system to a site whether it will be operated. They unpack and assemble the stimulator 100 and system. They mechanically configure the stimulator 100 and establish the range data feed 240 and GPS feed 256 for the site. They install a bore sight target 230 and obtain its GPS coordinates. The laser units 104, 106 and the sight 114 are aligned and laser power is verified and calibrated with laser power meters if desired. Then, they initiate the computing system 210 and the user interface 254. User point data is input for the bore sight target 230 and other points of interest 324. The operator calibrates the IMU unit 112 with this data by pressing the auxiliary switch 120. The safety relays 304, 305 are configured to provide a specified safety zone 334 for operation of the laser units 104, 106. The operational scenarios can vary. In one scenario, a spotter determines which items of interest to display on the user interface 254. The spotter calls out appropriate heading and elevation to the operator who directs the stimulator 100 onto the item of interest. The operator aligns the sight 114 on the item of interest and confirms the item with the spotter. At this point, the operator can engage the item such as an aircraft and its laser sensors or warning devices by activating the laser units 104, 106 with switches 116, 118. The operator can continue lasing from a standing rifle stance, a shoot from the hip stance, or other position or the spotter and operator can track and acquire other targets or cease engagement after a particular time has elapsed. In another scenario, the operator identifies an item of interest through observation using the sight 114 or night vision goggles. The operator aligns the sight 114 with the item without firing the laser units 104, 106. The spotter evaluates the stimulator 100 heading and confirms the suitability of the item for engagement. The operator can engage the item and its sensors and other devices after spotter confirmation. The operator and spotter continue to monitor the situation and cease engagement if necessary or once maximum time has elapsed.

As seen from the foregoing disclosure, the laser sensor stimulator offers a unique capability to engage and stimulate laser detectors, sensors, and warning receivers of aircraft in-flight, vehicles in transit, and other items of interest. It provides this functionality in a compact, portable system that is easy to assemble and operate with safety features to protect operators and other personnel involved. The ergonomic design, graphical user interface, and other features of the system make the task of training operators to use the system straightforward with little prior experience or expertise required in the use of lasers or tracking. The modular design of the system allows customized configurations to support a wide range of detectors at relatively low cost and minimal manpower. The laser sensor stimulator provides high-quality, reliable and traceable laser sensor stimulation via direct illumination. It includes numerous features that give it unique capabilities including by way of example and not limitation, ground and air target stimulation capability operational from short to medium range of 10-20 km depending on the range and strength of the lasing units. This range can be extended by using stronger lasers. The laser units can be reconfigured for different missions depending on the strength and frequency of laser unit desired. The absolute location and pointing attitude measurement together with the time logged recording capability of the system provide enhanced precision for laser sensor validation, laser state recording, and day and night compatibility and operation. The laser sensor stimulator's modular architecture reduces cost and improves its manufacturability. The portable design makes it easily transported and provides for simple, rapid setup and operation by one or two persons. The ergonomic physical design and dynamic user interface and controls improve operation and performance within a ruggedized construction that provides shock/vibration protection, moisture resistance, and the capability of operating in extreme temperatures and environments. Additional safety measures include an automatic safety interlock for the laser units based on reconfigurable safety criteria. The stand-alone, host-controlled, and master/slave configurations and operation enable the laser sensor stimulator to be used in a complete spectrum of research, development, test, and evaluation activities. The system can be powered by DC or AC power sources or batteries. The laser sensor stimulator also includes a modular extensible software architecture that provides bi-directional interfacing with standard civilian and defense department range data feeds and telemetry formats, operator situational awareness and target location, audible alerts and target position call-outs, sure-safe operation with keep-out regions and target-to-target proximity alerts, GPS time-correlated mission event logging for post-test data reduction, and mission replay.

The foregoing disclosure has been presented for purposes of illustration and description and is not intended to be exhaustive or to limit the disclosure to the devices, systems, methods, and forms disclosed herein. Persons skilled in the art will realize and appreciate that many modifications and variations are possible in light of the above teaching. For example, although the laser sensor stimulator was illustrated with two laser units, it can be configured more or less laser units depending on the application and capabilities desired. Moreover, other emitters and energy sources may be attached to the stimulator to emit energy for testing other types of sensors and warning devices. The disclosed methods and associated apparatuses and their variations were described to best explain the principles of the invention and its practical applications to thereby enable other persons skilled in the art to make and use the invention in its various forms and with its various modifications as are suited to the particular uses contemplated. The scope of the invention is to be defined by the following claims.

What is claimed is:

1. A laser sensor stimulator, configured to stimulate a laser sensor, the laser sensor stimulator comprising:
    a housing;
    a laser unit removably attached to the housing;
    an inertial measurement unit attached to the housing;
    a switch for activating the laser unit; and
    a control unit-in electrical communication with the laser unit, the inertial measurement unit, and the switch, the control unit configured to control and receive data from at least one of the laser unit and the inertial measurement unit.

2. The laser sensor stimulator claim 1, further comprising:
    a sight attached to the housing;
    an adjustable rifle stock attached to the housing; and
    a foregrip attached to the housing, the foregrip including a retractable bipod,
    wherein the rifle stock and the foregrip provide an ergonomic design to permit operation of the laser sensor stimulator in a standing rifle position or a prone position.

3. The laser sensor stimulator of claim 1, wherein the control unit includes safety relays in electrical communication with the switch to prevent operation of the laser unit.

4. The laser sensor stimulator of claim 1, further comprising an auxiliary switch, wherein the auxiliary switch is in electrical communication with the control unit for calibrating the laser sensor stimulator and the inertial measurement unit.

5. The laser sensor stimulator of claim 1, further comprising:
    a computing device connected to the laser sensor stimulator and the control unit via an umbilical cord,
    wherein the computing device receives range data including data streams of aircraft positions and other identifiers and GPS data from external feeds,
    wherein the computing device further receives status and operational information from the laser sensor stimulator, and
    wherein the computing device processes the range and GPS data and the status and operational information to create a user interface of an operational environment and operation of the laser sensor stimulator.

6. The laser sensor stimulator of claim 5, further comprising a DC or AC power source for powering the laser sensor stimulator and the computing device, wherein the power source includes a converter for converting the DC or AC power source to a DC source for powering the computing device, the control unit, and the laser unit.

7. The laser sensor stimulator of claim 1, wherein the control unit is configured to lock out the laser unit and play a sound to alert an operator when the laser sensor stimulator is aimed at an item of interest within a predefined safety zone or outside of a predefined azimuth.

8. The laser sensor stimulator claim 2, further comprising:
    a strap attached to the housing,
    wherein the rifle stock and the strap further provide an ergonomic design to permit operation of the laser sensor stimulator in a shoot-from-the-hip position.

* * * * *